US012693643B2

(12) United States Patent
Kobayashi et al.

(10) Patent No.: US 12,693,643 B2
(45) Date of Patent: Jul. 28, 2026

(54) INFORMATION PROCESSING DEVICE AND COMPUTER-READABLE STORAGE MEDIUM

(71) Applicant: FANUC CORPORATION, Yamanashi (JP)

(72) Inventors: Masanori Kobayashi, Yamanashi (JP); Akira Kanemaru, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 18/261,837

(22) PCT Filed: Feb. 21, 2022

(86) PCT No.: PCT/JP2022/006918
§ 371 (c)(1),
(2) Date: Jul. 18, 2023

(87) PCT Pub. No.: WO2022/181535
PCT Pub. Date: Sep. 1, 2022

(65) Prior Publication Data
US 2024/0302806 A1 Sep. 12, 2024

(30) Foreign Application Priority Data

Feb. 24, 2021 (JP) ................................. 2021-027927

(51) Int. Cl.
*G05B 15/02* (2006.01)
(52) U.S. Cl.
CPC .................................... *G05B 15/02* (2013.01)

(58) Field of Classification Search
CPC ...................................................... G05B 15/02
(Continued)

(56) References Cited

U.S. PATENT DOCUMENTS 7,069,185 B1 * 6/2006 Wilson ................. G05B 19/058
702/182
2016/0098035 A1 * 4/2016 Sinn .................. G05B 19/40937
700/182
(Continued)

FOREIGN PATENT DOCUMENTS

CN 110221577 A 9/2019
CN 112396429 A 2/2021
(Continued)

*Primary Examiner* — Mohammad Ali
*Assistant Examiner* — Joshua T Sanders
(74) *Attorney, Agent, or Firm* — HAUPTMAN HAM, LLP

(57) ABSTRACT

An information processing device includes a summary request storage unit that stores a summary request created in advance; a summary request management unit that receives a summary request acquisition request, that reads, from the summary request storage unit, a summary request included in the summary request acquisition request, and that provides the summary request thus read; a command execution unit that executes a command read from an application program; and a summary request execution unit that, in a case where the command is a summary request execution command, issues, to the summary request management unit, the summary request included in the summary request execution command, and executes the summary request acquired as a response to the request.

4 Claims, 6 Drawing Sheets

(58) Field of Classification Search
USPC .......................................................... 700/83
See application file for complete search history.

(56)                     References Cited

U.S. PATENT DOCUMENTS

| | | | |
|---|---|---|---|
| 2017/0337226 A1* | 11/2017 | Bliss ................... | H04L 67/1097 |
| 2019/0146459 A1* | 5/2019 | Nakajima .......... | G05B 19/4186 |
| | | | 700/28 |
| 2019/0271968 A1 | 9/2019 | Kimura et al. | |

FOREIGN PATENT DOCUMENTS

| | | | | |
|---|---|---|---|---|
| EP | 0136485 A2 * | 4/1985 | .......... | G05B 19/058 |
| JP | S61-090211 A | 5/1986 | | |
| JP | 2009-211183 A | 9/2009 | | |
| JP | 2019-087208 A | 6/2019 | | |

\* cited by examiner

FIG. 4

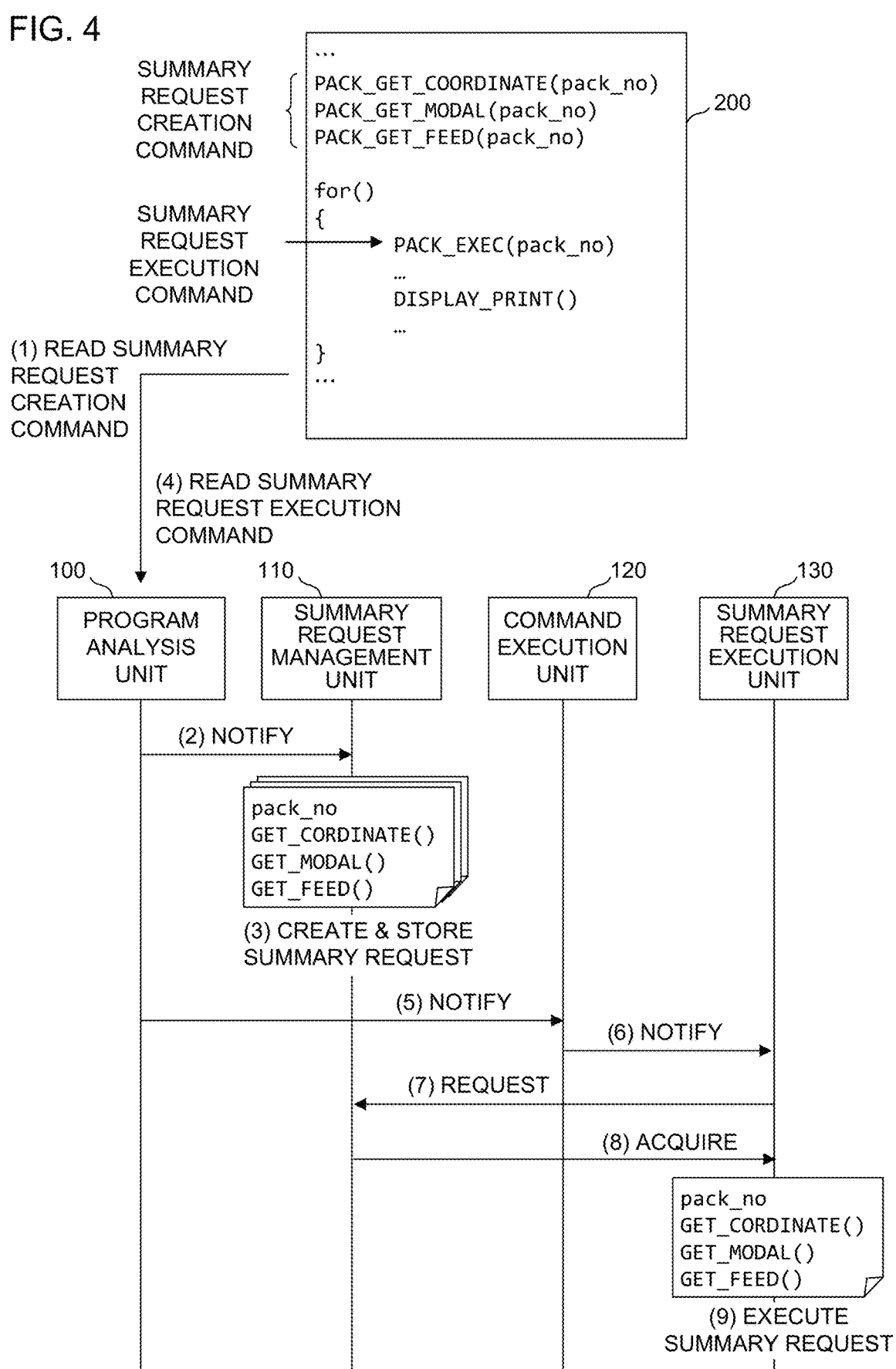

SUMMARY REQUEST CREATION COMMAND
```
...
PACK_GET_COORDINATE(pack_no)
PACK_GET_MODAL(pack_no)
PACK_GET_FEED(pack_no)
```

200

SUMMARY REQUEST EXECUTION COMMAND
```
for()
{
        PACK_EXEC(pack_no)
        ...
        DISPLAY_PRINT()
        ...
}
...
```

(1) READ SUMMARY REQUEST CREATION COMMAND (4) READ SUMMARY REQUEST EXECUTION COMMAND

100
PROGRAM ANALYSIS UNIT

110
SUMMARY REQUEST MANAGEMENT UNIT

120
COMMAND EXECUTION UNIT

130
SUMMARY REQUEST EXECUTION UNIT (2) NOTIFY

```
pack_no
GET_CORDINATE()
GET_MODAL()
GET_FEED()
```

(3) CREATE & STORE SUMMARY REQUEST (5) NOTIFY (6) NOTIFY (7) REQUEST (8) ACQUIRE

```
pack_no
GET_CORDINATE()
GET_MODAL()
GET_FEED()
```

(9) EXECUTE SUMMARY REQUEST

FIG. 6

```
#define PACK_TABLE

PACK_ON(pack_no = 1);
    GET_COORDINATE()
    GET_MODAL()
    GET_FEED()
PACK_OFF();

PACK_ON(pack_no = 2);
    GET_COMND ()
    GET_PROGNUM()
    GET_PROGBLOCK()
PACK_OFF();

PACK_ON(pack_no = 3);
    GET_ERR()
    GET_INTEGRATED()
    GET_ACCUMULATED()
PACK_OFF();
...
```

INFORMATION PROCESSING DEVICE AND COMPUTER-READABLE STORAGE MEDIUM

RELATED APPLICATIONS

The present application is a National Phase of International Application No. PCT/JP2022/006918 filed Feb. 21, 2022, which claims priority to Japanese Application No. 2021-027927, filed Feb. 24, 2021.

TECHNICAL FIELD

The present invention relates to an information processing device that acquires information from a control device based on a command from an application program, and a computer-readable storage medium storing a program that is executed in the information processing device.

BACKGROUND ART

A general control system is configured such that an information processing device such as an operation monitoring device or a production planning device, and a control device such as a numerical controller for controlling a machine tool or a processing machine, a robot controller for controlling a robot, and a programmable logic controller (PLC) are connected via a communication interface in a communication network such as an Ethernet network. Control-related information is exchanged between the information processing device and the control device. When there is an increase in the control-related information to be exchanged, problems arise such as an increased load on the communication processing in the control device and an increase in the time until the application operating in the information processing device acquires data, and at the same time, the load on the network increases.

For the purpose of solving such problems, a technique for reducing the number of communications of each information processing device communicating with the control device and integrating data requests and control data transfers is disclosed (for example, Patent Literature 1 and the like). Conventionally, different information acquisition such as the acquisition of coordinate values, acquisition of modal information, and acquisition of speed information has been executed using different communication processing. By using the technique disclosed in Patent Literature 1 and the like, a plurality of types of information acquisition can be performed in one communication processing, thereby enabling a reduced load on the communication processing.

CITATION LIST

Patent Literature

Patent Literature 1: JP 2019-87208 A

SUMMARY OF INVENTION

Technical Problem

In a case where a plurality of types of information is acquired in bulk, it is necessary to create a "summary request" for acquiring the information in bulk. In order to create this summary request, a certain load is generated in the information processing device. Here, the information processing device needs to sequentially acquire the control state of a machine using the control device. For example, in a case where it is necessary to sequentially display the position of the axis of the machine and the execution status of the control program on the display screen of the management device, creation of a summary request and acquisition of a plurality of types of information are always repeated. Accordingly, the summary request creation processing is repeatedly executed by the information processing device at all times, and the load cannot be ignored.

In a system in which such summary request creation processing is repeatedly performed, a technical mechanism capable of efficiently creating a summary request is required.

Solution to Problem

In the present invention, a summary request is created and stored once in advance, and the stored summary request is read at the time of data acquisition, thus reducing the communication processing load (the load of the summary request creation processing) of the application applied for each data acquisition, thereby solving the above problem.

An embodiment of the present invention is an information processing device that, based on a command from an application program, acquires a plurality of types of information from a control device that controls a machine, the information processing device including: a summary request storage unit for storing at least one summary request associated with summary request identification information; a summary request management unit that receives a summary request acquisition request, that reads, from the summary request storage unit, a summary request associated with the summary request identification information included in the summary request acquisition request, and that provides the summary request thus read; a command execution unit that executes a command read from the application program; and a summary request execution unit that, in a case where the command is a summary request execution command, issues a request to the summary request management unit requesting the summary request associated with summary request identification information included in the summary request execution command, and executes the summary request acquired as a response to the request.

Another embodiment of the present invention is a computer-readable storage medium for storing a program that is executed in an information processing device that, based on a command from an application program, acquires in bulk a plurality of types of information from a control device that controls a machine, the program executing: in a case where the command read from the application program is a command relating to execution of a summary request, processing to acquire a summary request associated with summary request identification information included in the command, from a summary request storage unit storing at least one summary request associated with the summary request identification information; and processing to acquire in bulk a plurality of types of information from the control device, based on the summary request associated with the summary request identification information thus acquired.

Advantageous Effects of Invention

According to the present invention, it is possible to reduce the communication processing load (the load of the summary request creation processing) of the application applied to each data acquisition by once creating and storing the summary request at the beginning of the program and reading the stored summary request at the time of data acquisition.

BRIEF DESCRIPTION OF DRAWINGS

FIG. 4 is a diagram illustrating another example of the flow of summary request creation in the control system according to the first embodiment.

FIG. 6 is a diagram showing an example of a summary request definition file.

DESCRIPTION OF EMBODIMENTS

Hereinafter, a configuration example of a control system for realizing the present invention is provided.

Figure 1:
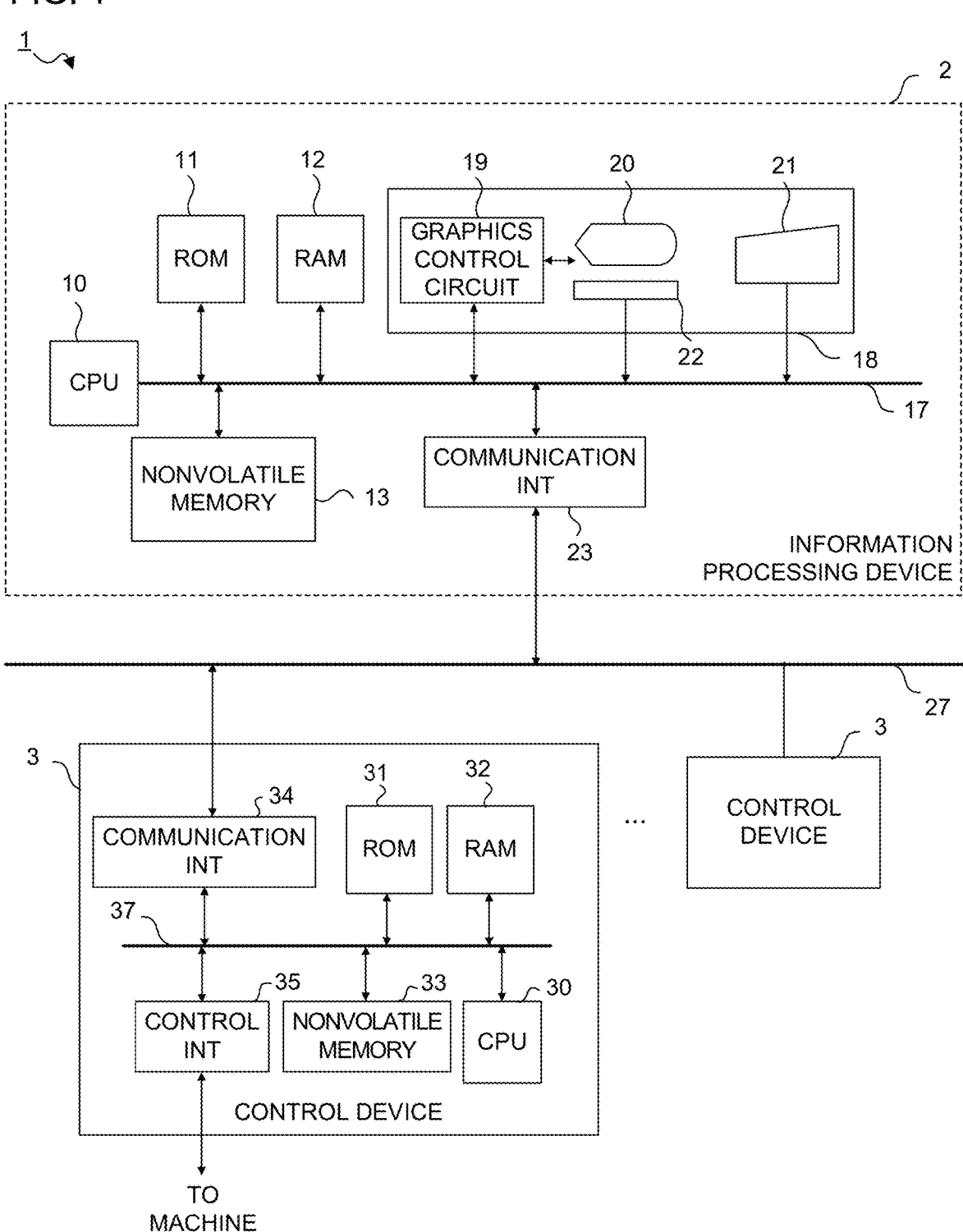
FIG. 1 is a schematic hardware configuration diagram showing the main parts of a control system according to a first embodiment.

FIG. 1 is a schematic hardware configuration diagram showing the main parts of a control system according to a first embodiment.

A control system 1 according to the present embodiment is configured by connecting, via a wired/wireless network 27, at least one control device 3 and an information processing device 2 that receives information from the control device 3. In the control system 1 according to the present embodiment, the control device 3 controls a machine (not illustrated) such as a manufacturing device or a robot. During the control of the machine by the control device 3, a huge amount of information relating to the control is generated as data and accumulated, as necessary, in a memory or the like. Further, in the control system 1, the information processing device 2 acquires data generated by the control device 3 as necessary, and uses the data to manage the entire control system 1.

The information processing device 2 according to the present embodiment can be mounted as, for example, a personal computer or the like that is attached to the control device 3, or can be mounted as a computer such as a fog computer or a cloud server connected to the control device 3 via the network 27.

The information processing device 2 is mainly configured from a CPU 10. The constituent elements included in the information processing device 2 are connected via a bus 17, and exchange data with each other via the bus 17. The CPU 10 controls the entire information processing device 2 according to a system program stored in the ROM 11. An EPROM, an EEPROM, or the like is used for the ROM 11.

A DRAM or the like is used for the RAM 12, and temporary calculation data, display data, and the like are stored therein. A memory, a solid state drive (SSD), or the like backed up by a battery (not illustrated) is used as a nonvolatile memory 13, and a storage state is maintained even when the information processing device 2 is powered off.

A user interface device 18 is used to display data and graphics required for the operation of the information processing device 2, and to receive manual operation inputs from an operator, data inputs, and the like. The graphics control circuit 19 converts digital signals such as numerical data and graphics data into raster signals for display, and sends the raster signals to the display device 20. The display device 20 displays these numerical values and graphics. A liquid-crystal display device is mainly used as the display device 20.

An input device 21 is configured from a keyboard including a key switch, a rotary switch, numerical keys, symbolic keys, character keys, and function keys, and a pointing device such as a mouse.

The touch panel 22 has a function for detecting an operation such as touching or dragging by an operator. The touch panel 22 is arranged so as to be superimposed on a screen of the display device 20, and an operation, which is performed by an operator with respect to a software key, a software button, or a software switch displayed on the screen of the display device 20, can be detected by the touch panel 22. Note that the touch panel 22 and the display device 20 may be combined into one device.

A communication interface 23 performs data communication with the control device 3 and the like connected to the network 27 via the wired/wireless network 27. A control program executed by the control device 3 which is to be managed, information relating to the results of executing the program, and information relating to signals acquired during execution of the program, and the like, can be acquired via the communication interface 23.

Meanwhile, the control device 3 is mainly configured from a CPU 30. The constituent elements included in the control device 3 are connected via a bus 37, and exchange data with each other via the bus 37. The CPU 30 controls the entire control device 3 according to a system program stored in a ROM 31. An EPROM, an EEPROM, or the like is used for the ROM 31.

A DRAM or the like is used for the RAM 32, and temporary calculation data, display data, and the like, are stored therein. A CMOS, an SRAM, or the like, backed up by a battery (not illustrated) is used for the nonvolatile memory 33, and parameters and the like which should be held even after the power supply is turned off are stored therein.

A control interface 35 is connected to various machines such as a machine tool or a robot, and the control device 3 controls the various machines via the control interface 35. The control interface 35 is configured, for example, from an axis control circuit, a programmable logic controller (PLC), and the like. When controlling a machine, the control interface 35 acquires information of each unit of the machine and detects and acquires the operation status of the machine by using a sensor (not illustrated).

A communication interface 34 performs data communication with the information processing device 2 and the like connected to the network 27 via the wired/wireless network 27.

Figure 2:
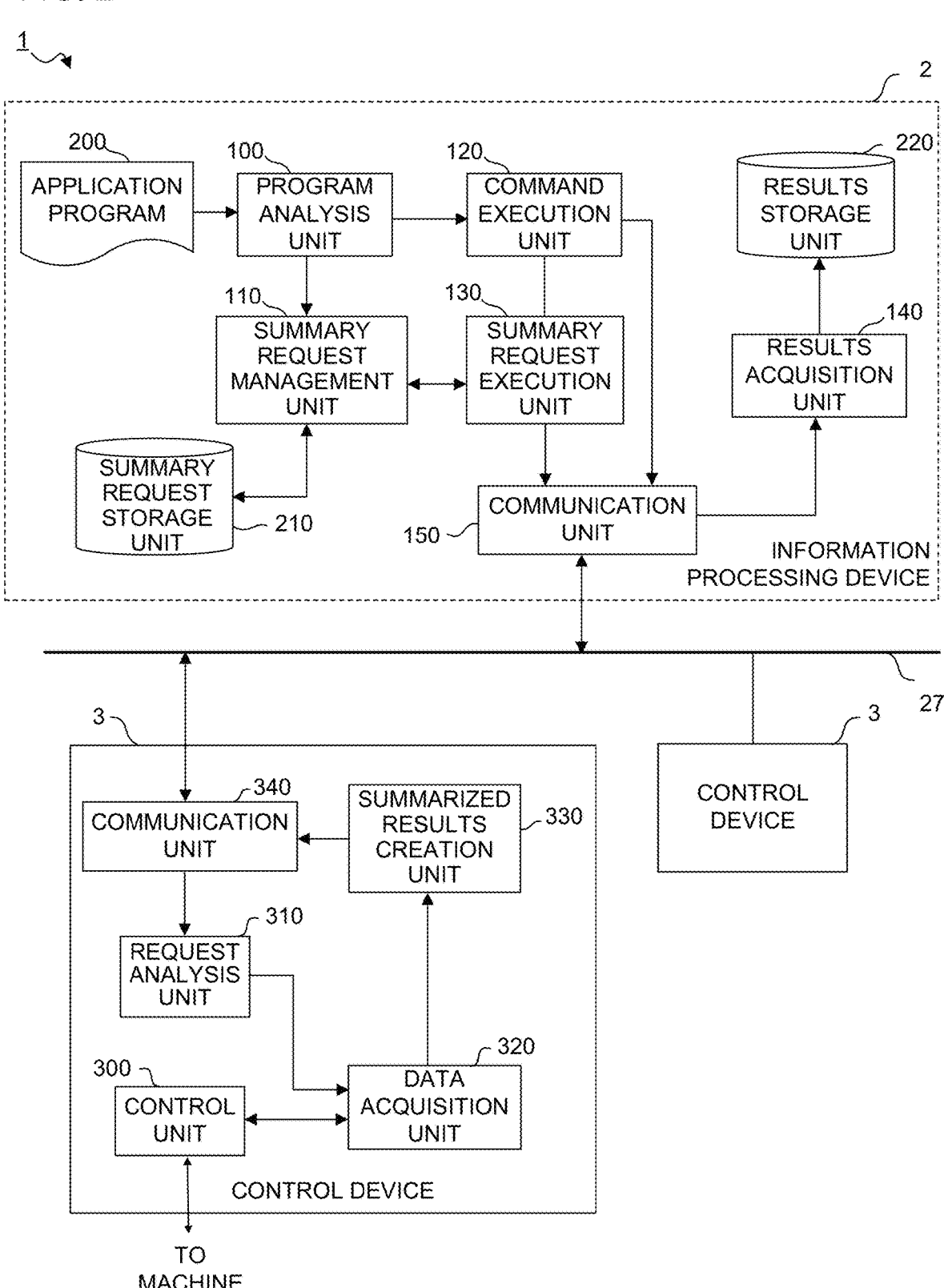
FIG. 2 is a schematic functional block diagram of a control system according to the first embodiment.

FIG. 2 is a schematic block diagram showing functions of the control system 1 according to the first embodiment of the present invention.

The functions of the control system 1 according to the present embodiment are realized by the CPU 10 included in the information processing device 2 and the CPU 30 included in the control device 3 in the control system 1 shown in FIG. 1 executing respective system programs and controlling the operations of the respective units of the information processing device 2 and the control device 3. These system programs can be provided by being stored on a storage medium such as a magnetic disk or an optical disk or the like, for example, or a wired or wireless network can be provided as a medium.

The information processing device 2 constituting the control system 1 according to the present embodiment includes a program analysis unit 100, a summary request management unit 110, a command execution unit 120, a summary request execution unit 130, a results acquisition unit 140, and a communication unit 150. Furthermore, an application program 200 executed by the information processing device 2 is stored in advance in the RAM 12 or the nonvolatile memory 13 of the information processing device 2, and further, a summary request storage unit 210 which is an area for storing summary requests, and a results storage unit 220 which is an area for storing data acquired from the control device 3 are prepared in advance. In addition to the above-described functions, the information processing device 2 according to the present embodiment has a function for realizing a function included in a general information processing device, but a description thereof will be omitted in the present specification.

The program analysis unit 100 is realized by the CPU 10 included in the information processing device 2 shown in FIG. 1 executing a system program read from the ROM 11, and by the CPU 10 mainly performing arithmetic processing using the RAM 12 and the nonvolatile memory 13. The program analysis unit 100 analyzes the application program 200, extracts a command relating to summary request management which is included in the application program 200, and notifies the summary request management unit 110 of the extracted command. In addition, the command execution unit 120 is notified of a command other than the command relating to summary request management. In the information processing device 2 according to the present embodiment, the command relating to summary request management includes, for example, a command to create the summary request.

The summary request management unit 110 is realized by the CPU 10 included in the information processing device 2 shown in FIG. 1 executing a system program read from the ROM 11, and by the CPU 10 mainly performing arithmetic processing using the RAM 12 and the nonvolatile memory 13. The summary request management unit 110 creates a summary request (one data packet including a plurality of data acquisition requests), based on the command to create the summary request as notified by the program analysis unit 100, and stores the created summary request in the summary request storage unit 210. The summary request management unit 110 stores the summary request in association with summary request identification information that is designated by the command relating to the summary request. The summary request identification information is, for example, information configured from numerical values, alphabetical characters, and the like, and is information for uniquely identifying the summary request.

In addition, in response to the request from the summary request execution unit 130, the summary request management unit 110 reads the summary request associated with the summary request identification information included in the request from the summary request storage unit 210, and provides the summary request thus read to the summary request execution unit 130.

The command execution unit 120 is realized by the CPU 10 included in the information processing device 2 shown in FIG. 1 executing a system program read from the ROM 11, and by the CPU 10 mainly performing arithmetic processing using the RAM 12 and the nonvolatile memory 13. The command execution unit 120 controls each unit of the information processing device 2 based on the command included in the application program 200 as notified by the program analysis unit 100. However, in a case where the command notified by the program analysis unit 100 is a summary request execution command, the command execution unit 120 issues a request to the summary request execution unit 130 to execute the summary request together with the summary request identification information designated by the execution command. The summary request execution command includes at least summary request identification information and information identifying the control device 3 constituting the data acquisition request destination of the summary request.

The summary request execution unit 130 is realized by the CPU 10 included in the information processing device 2 shown in FIG. 1 executing a system program read from the ROM 11, and by the CPU 10 mainly performing arithmetic processing using the RAM 12 and the nonvolatile memory 13. The summary request execution unit 130 issues a request to the summary request management unit to acquire the summary request associated with the summary request identification information included in the request from the command execution unit 120. The summary request execution unit 130 then issues a notification to the communication unit 150 to transmit the summary request acquired from the summary request management unit 110 to the control device 3 constituting the data acquisition request destination.

The results acquisition unit 140 is realized by the CPU 10 included in the information processing device 2 shown in FIG. 1 executing a system program read from the ROM 11, and the CPU 10 mainly performing arithmetic processing using the RAM 12 and the nonvolatile memory 13. The results acquisition unit 140 receives, via the communication unit 150, a summarized result as a response to the summary request to the control device 3 constituting the data acquisition request destination, and stores the summarized result in the results storage unit 220. When receiving the summarized result from the data acquisition request destination, the results acquisition unit 140 extracts the respective results data from the summarized result and stores the extracted respective results data in a predetermined area of the results storage unit 220. Each item of results data stored in the results storage unit 220 is used, for example, by being displayed on the display device 20 or being recorded in an external storage device (not shown) according to a command of the application program 200.

The communication unit 150 is realized by the CPU 10 included in the information processing device 2 shown in FIG. 1 executing a system program read from the ROM 11, and by the CPU 10 mainly performing arithmetic processing using the RAM 12 and the nonvolatile memory 13 and input/output processing using the communication interface 23. The communication unit 150 executes processing to transmit and receive data to and from another device via the network 27, based on a command from another functional means and communication from the network 27.

However, the control device 3 constituting the control system 1 according to the present embodiment includes a control unit 300, a request analysis unit 310, a data acquisition unit 320, a summarized results creation unit 330, and a communication unit 340. The control device 3 according to the present embodiment includes functional means for realizing functions of a general control device in addition to the aforementioned functional means, but descriptions thereof are omitted from the present specification.

The control unit 300 is realized by the CPU 30 included in the control device 3 shown in FIG. 1 executing a system program read from the ROM 31, and by the CPU 30 mainly performing arithmetic processing using the RAM 32 and the nonvolatile memory 33, and input/output processing using the control interface 35. The control unit 300 controls the machine according to a program for machine control or the like. The control unit 300 issues an operation command to the machine while acquiring information on each unit of the machine and the operation status of the machine.

The request analysis unit 310 is realized by the CPU 30 included in the control device 3 shown in FIG. 1 executing a system program read from the ROM 31, and by the CPU 30 mainly performing arithmetic processing using the RAM 32 and the nonvolatile memory 33. The request analysis unit 310 analyzes the data acquisition request or the summary request received via the communication unit 340, and, based on the analysis result, instructs the data acquisition unit 320 to acquire necessary data. In a case where a normal data acquisition request according to the prior art is received, the request analysis unit 310 instructs the data acquisition unit 320 to acquire the requested data similarly to the prior art. However, in a case where a summary request is received, the request analysis unit 310 extracts the respective data acquisition requests from the summary request, and instructs the data acquisition unit 320 to acquire each data item requested by the respective data acquisition requests.

The data acquisition unit 320 is realized by the CPU 30 included in the control device 3 shown in FIG. 1 executing a system program read from the ROM 31, and by the CPU 30 mainly performing arithmetic processing using the RAM 32 and the nonvolatile memory 33. The data acquisition unit 320 acquires each data item relating to control by the control unit 300, based on a request from the request analysis unit 310, and notifies the summarized results creation unit 330 of the acquired data.

The summarized results creation unit 330 is realized by the CPU 30 included in the control device 3 shown in FIG. 1 executing a system program read from the ROM 31, and by the CPU 30 mainly performing arithmetic processing using the RAM 32 and the nonvolatile memory 33. The summarized results creation unit 330 creates, based on the data acquired by the data acquisition unit 320, data constituting a response to the information processing device 2, and instructs the communication unit 340 to transmit the created data to the information processing device 2. In a case where a normal data acquisition request according to the prior art is received, the summarized results creation unit 330 instructs the communication unit 340 to respond to the requested data similarly to the prior art. However, in a case where a summary request is received, the summarized results creation unit 330 creates summarized results, which are obtained by summarizing the data requested by each data acquisition request included in the summary request, and instructs the communication unit 340 to send back the created summarized results to the source of the data acquisition request. The summarized results creation unit 330 creates one summarized result (one data packet including a plurality of data items) obtained by summarizing a plurality of data items requested by each data acquisition request included in the summarized result.

The communication unit 340 is realized by the CPU 30 included in the control device 3 shown in FIG. 1 executing a system program read from the ROM 31, and by the CPU 30 mainly performing arithmetic processing using the RAM 32 and the nonvolatile memory 33 and input/output processing using the communication interface 34. The communication unit 340 executes processing to transmit and receive data to and from another device via the network 27, based on a command from another function and communication via the network 27.

Figure 3:
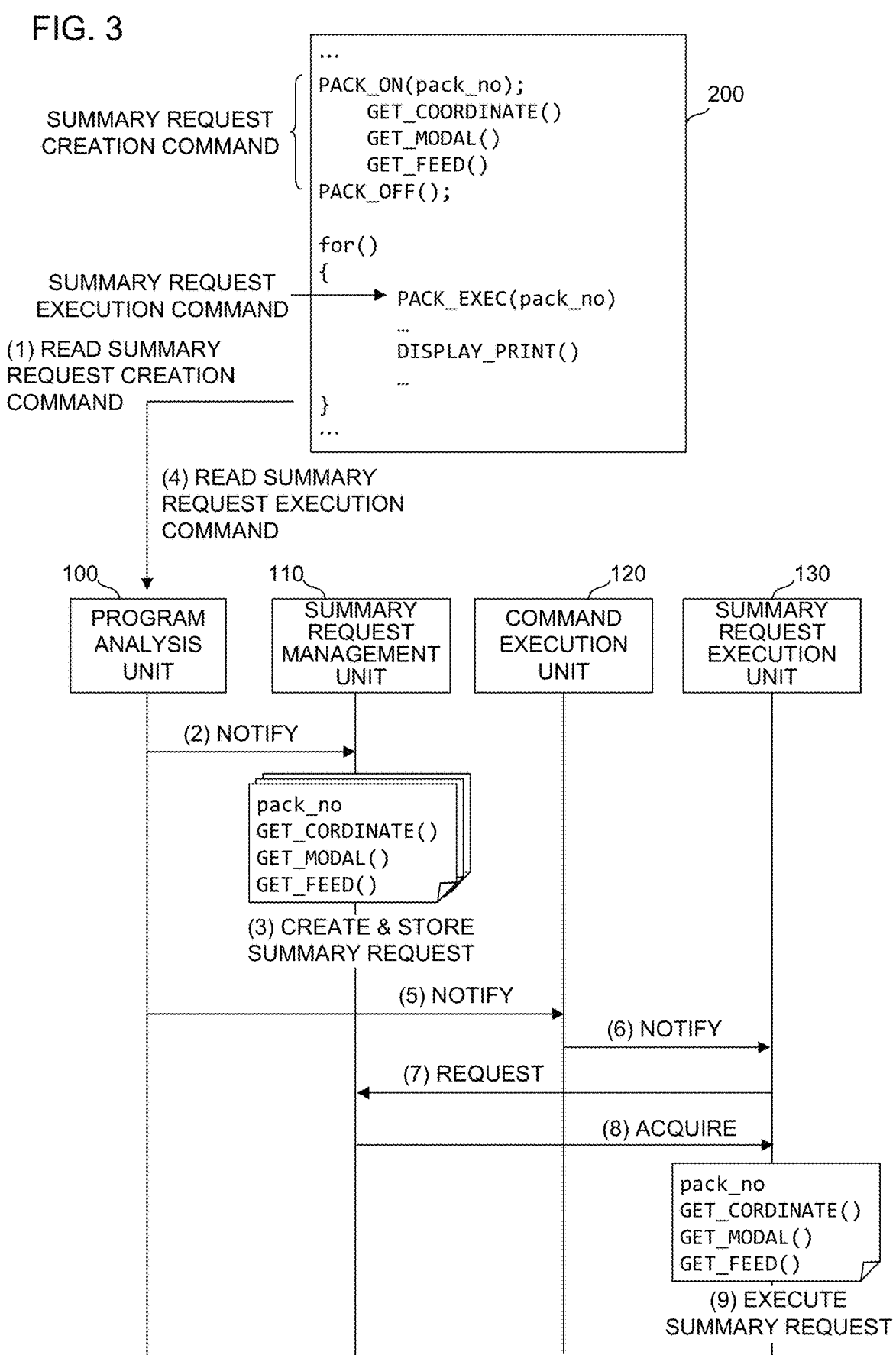
FIG. 3 is a diagram illustrating the flow of summary request creation in the control system according to the first embodiment.

An operation flow of each function of the information processing device 2 will be described with reference to FIGS. 3 and 4. FIGS. 3 and 4 illustrate the flow from the creation of a summary request to the execution of the summary request.

FIG. 3 shows an example in which a command "PACK_ON" to start the creation of a summary request and a command "PACK_OFF" to end the creation of the summary request are used as "summary request" creation commands. Using the summary request creation start command "PACK_ON", the summary request identification information ("pack_no" in FIG. 3) for uniquely identifying the summary request is issued as an argument. A summary request creation start command "PACK_ON (pack_no)" and a summary request creation end command "PACK_OFF" are used to create a summary request obtained by summarizing data acquisition commands issued between the summary request creation start command "PACK_ON (pack_no)" and the summary request creation end command "PACK_OFF".

In the example of FIG. 3, first, (1) the program analysis unit 100 reads a summary request creation command from a program. Next, (2) the program analysis unit 100 issues a notification to the summary request management unit 110 to create the summary request identified in the summary request identification information (pack_no) designated by the summary request creation command. It is instructed to include, in the summary request, GET_COORDINATE (a coordinate value data acquisition command to acquire coordinate values of each axis of the machine), GET_MODAL (a modal information acquisition command to acquire modal information), and GET_FEED (a speed information acquisition command to acquire the movement speed of the drive unit of the machine).

Upon receiving the notification from the program analysis unit 100, (3) the summary request management unit 110 creates a summary request for acquiring, in bulk, the coordinate value data acquisition command, the modal information acquisition command, and the speed information acquisition command, and stores the summary request in the summary request storage unit 210 in association with the summary information identification information pack_no. Accordingly, every time the creation of the summary request is instructed, the summary request associated with each piece of summary information identification information is created and stored in the summary request storage unit 210.

Thereafter, the commands included in the application program 200 are sequentially read and analyzed, and the command execution unit 120 executes the commands. Further, (4) upon reading the summary request execution command, the program analysis unit 100 notifies the command execution unit 120 of (5) the summary request execution command. (6) Upon notification regarding the summary request execution command, the command execution unit 120 issues a notification to the summary request execution unit 130 to execute the summary request associated with the summary request identification information designated by the summary request execution command. Upon receiving the notification, (7) the summary request execution unit 130 issues a request to the summary request management unit 110 requesting the summary request associated with the summary request identification information designated by the summary request execution command. (8) The summary request management unit 110, which has received the request, reads the summary request associated with the summary request identification information from the summary request storage unit 210 and delivers the summary request to the summary request execution unit 130. Finally, (9) the summary request execution unit 130 executes the acquired summary request.

FIG. 4 shows an example in which a command to create the summary request corresponding to each data acquisition command is prepared as the "summary request" creation command.

In the example of FIG. 4, a command (PACK_GET_xxx and the xxx part is different for each type of data) to be registered in the summary request is prepared for each type of data to be acquired. For example, PACK_GET_COOR-DINATE is prepared as a summary request creation command corresponding to the coordinate value data acquisition command GET_COORDINATE, PACK_GET_MODAL is prepared as a summary request creation command corresponding to the modal information acquisition command GET_MODAL, and PACK_GET_FEED is prepared as a summary request creation command corresponding to the speed information acquisition command GET_FEED. Each of these commands uses, as an argument, summary request identification information ("pack_no" in FIG. 3) for uniquely identifying the summary request, and is used to create a summary request associated with the designated summary request identification information (in a case where the summary request associated with the summary request identification information is not created) or to add data to be acquired (in a case where the summary request associated with the summary request identification information is already created).

In the example of FIG. 4, first, (1) the program analysis unit 100 sequentially reads a summary request creation command from the program. Next, (2) the program analysis unit 100 issues a notification to the summary request management unit 110 to create a summary request identified by the summary request identification information (pack_no) designated by the summary request creation command.

Upon receiving the notification from the program analysis unit 100, (3) the summary request management unit 110 first creates a summary request including a coordinate value data acquisition command at the moment when a PACK_GET_COORDINATE notification is issued. At this time, the created summary request is stored in the summary request storage unit 210 in association with pack_no. Next, when a PACK_GET_MODAL notification is issued, the summary request management unit 110 adds the modal information acquisition command to the summary request associated with pack_no. When the PACK_GET_FEED notification is issued, the summary request management unit 110 adds the speed information acquisition command to the summary request associated with pack_no. The subsequent processing is similar to that described in FIG. 3.

Note that, the examples of FIGS. 3 and 4 illustrate examples in a case where three data items, namely, coordinate value data, modal information, and speed information are acquired. However, the type of data to be acquired may be any data that can be acquired from a general control device 3. For example, various data can be targeted for acquisition, such as control axis/spindle relationship data (coordinate values, feed speed, spindle speed, and the like), control program relationship data (registered program list, executing program information, executing command information, executing block information, and the like), numerical control-related data (parameter information, offset information, and the like), history-related data (warning history, operation history, and the like), PLC-related data (PLC signal, timer information, and the like), and other data (system information, modal information, and the like). In addition, the quantity of data items to be acquired is not limited to three, and acquisition of the desired quantity of data items can be requested in bulk, and the results received, as necessary.

In the control system 1 according to the present embodiment described above, a summary request is created once and stored at the beginning of a program, and the stored summary request is read at the time of data acquisition, thereby reducing the communication processing load (the load of the summary request creation processing) of the application applied at each data acquisition. As a result, the time until the control data is acquired from the control device can be shortened. In addition, by storing the summary request, the summary request can be reused in other processing (threads, functions, and the like), thereby reducing the amount of code of the execution program, and facilitating programming.

As a modification of the control system 1 according to the present embodiment, the summary request management unit 110 may be configured capable of deleting a predetermined data acquisition command from the summary request stored in the summary request storage unit 210. For example, a delete command (for example, UNPACK_GET_xxx and the xxx part is different for each type of data) from the summary request is prepared in correspondence with the command to be registered in the summary request for each type of data illustrated in the example of FIG. 4. Further, upon notification regarding a delete command from the summary request, which takes the summary request identification information as an argument, the summary request management unit 110 specifies the summary request associated with the summary request identification information from the summary request storage unit 210, and deletes the data acquisition command of the designated type from the specified summary request. For example, in the example of FIG. 4, when an UNPACK_GET_COORDINATE (pack_no) notification is issued, a command (GET_COORDINATE) for acquiring coordinate value data is deleted from the summary request associated with the summary request identification information pack_no stored in the summary request storage unit 210.

By providing such a function, the data to be requested in bulk can be changed in accordance with the purpose of the monitoring by the control device 3 of the control state of the machine, and thus flexible data acquisition can be performed. For example, while a predetermined control state of the machine is being monitored by the control device 3, when a large load continues to be applied to the spindle for a predetermined time or more in the light of spindle load information, a data acquisition command to acquire temperature information of the machine or the like is added to the summary request, and hence a more detailed operation status of the machine is monitored. Further, once the operation state has stabilized, flexible control can be performed which involves deleting the added data acquisition command to return to a normal monitoring state, or the like.

Figure 5:
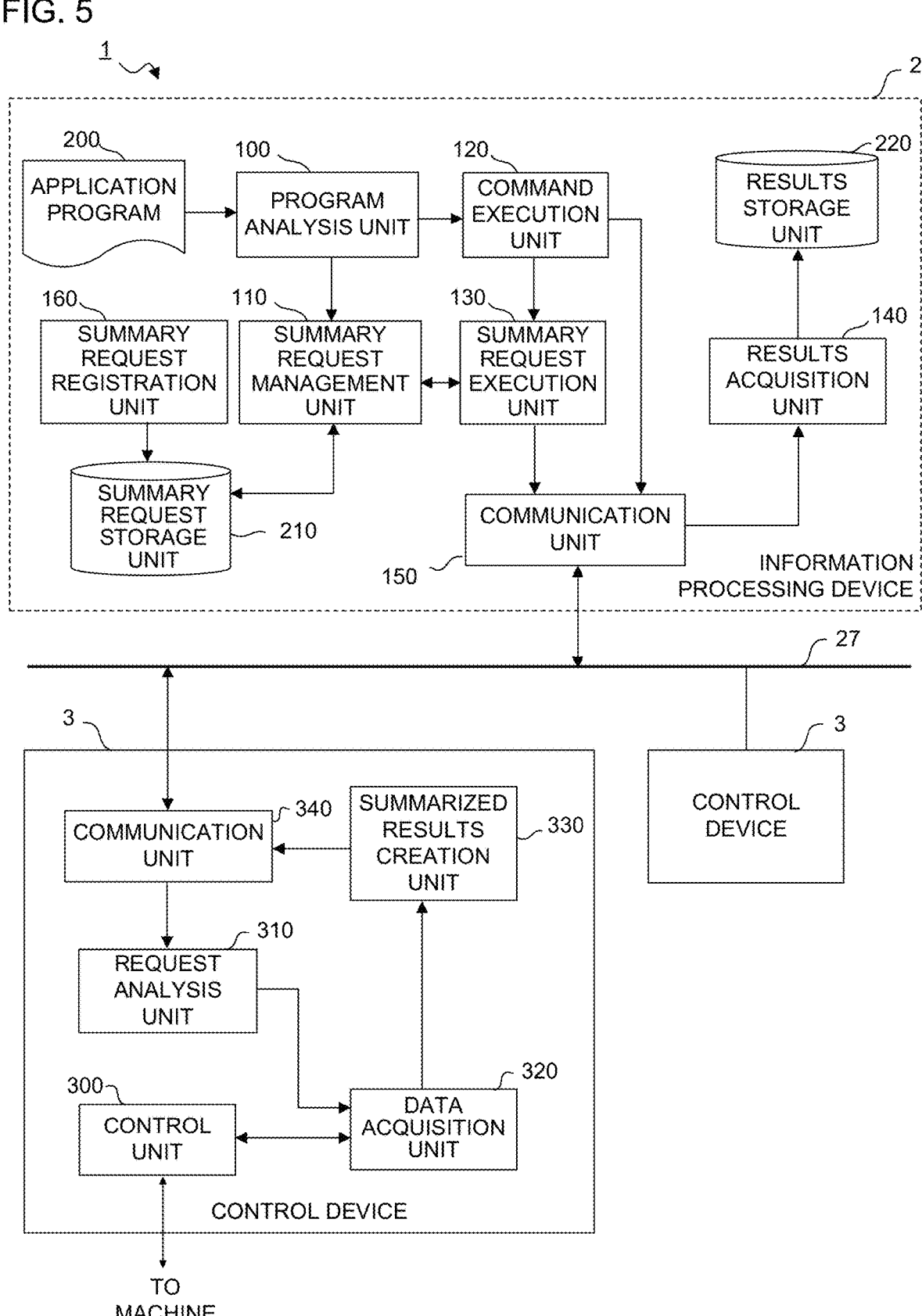
FIG. 5 is a schematic functional block diagram of a control system according to a second embodiment.

FIG. 5 is a schematic block diagram showing functions of the control system 1 according to the second embodiment of the present invention.

The functions of the control system 1 according to the present embodiment are realized by the CPU 10 included in the information processing device 2 and the CPU 30 included in the control device 3 in the control system 1 shown in FIG. 1 executing respective system programs and controlling the operations of the respective units of the information processing device 2 and the control device 3.

The information processing device 2 constituting the control system 1 according to the present embodiment includes a summary request registration unit 160 in addition to the program analysis unit 100, the summary request management unit 110, the command execution unit 120, the summary request execution unit 130, the results acquisition unit 140, and the communication unit 150. Furthermore, an application program 200 executed by the information processing device 2 is stored in advance in the RAM 12 or the nonvolatile memory 13 of the information processing device 2, and further, a summary request storage unit 210 which is an area for storing summary requests, and a results storage unit 220 which is an area for storing data acquired from the control device 3 are prepared in advance. In addition to the above-described functions, the information processing device 2 according to the present embodiment has a function for realizing a function included in a general information processing device, but a description thereof will be omitted in the present specification.

The program analysis unit 100, the summary request management unit 110, the command execution unit 120, the summary request execution unit 130, the results acquisition unit 140, and the communication unit 150 which are included in the information processing device 2 according to the present embodiment are similar to the functions included in the information processing device 2 according to the first embodiment.

The summary request registration unit 160 according to the present embodiment is realized by the CPU 30 included in the control device 3 shown in FIG. 1 executing a system program read from the ROM 31, and by the CPU 30 mainly performing arithmetic processing using the RAM 32 and the nonvolatile memory 33. The summary request registration unit 160 creates a summary request based on a definition file of the summary request created in advance, and stores the created summary request in the summary request storage unit 210. The summary request registration unit 160 reads, for example, a summary request definition file designated in response to an operation by an operator, and creates one or more summary requests which are defined by the file thus read. The summary request definition file may be stored in advance in the nonvolatile memory 13 of the information processing device 2 and read, or may be read from an external storage device (not illustrated). Furthermore, reading may be performed from another device via the network 27.

FIG. 6 shows an example of a summary request definition file. The summary request definition file is a file that defines, for at least one summary request, a data acquisition command included in the summary request and summary request identification information in association with each other. In the example of FIG. 6, three summary requests using the summary request creation start command PACK_ON and the summary request creation end command PACK_OFF are defined. Three summary requests, namely, pack_no1, pack_no2, and pack_no3, are created as a result of the summary request registration unit 160 reading the summary request definition file, and are stored in the summary request storage unit 210. The stored summary requests can be used by the summary request execution command as described in the first embodiment.

The control system 1 according to the present embodiment described above is capable of creating summary requests in advance by means of the summary request definition file. In the case of an operation monitoring device or a production planning device, a set of data that must be acquired from the control device may be generally agreed upon. In such a case, because a summary request is created in the summary request definition file in advance, it is not necessary to create a summary request for each application program, and thus the load involved in program creation is further reduced.

Although embodiments of the present invention have been described hereinabove, the present invention is not limited to only the examples of the foregoing embodiments, and, rather, can be carried out using various modes by adding appropriate modifications.

REFERENCE SIGNS LIST

1 Control system
2 Information processing device
3 Control device
10 CPU
11 ROM
12 RAM
13 Non-volatile memory
17 Bus
18 User interface device
19 Graphics control circuit
20 Display device
21 Input device
22 Touch panel
23 Communication interface
27 Network
30 CPU
31 ROM
32 RAM
33 Non-volatile memory
34 Communication interface
35 Control interface
37 Bus
100 Program analysis unit
110 Summary request management unit
120 Command execution unit
130 Summary request execution unit
140 Results acquisition unit
150 Communication unit
160 Summary request registration unit
200 Application program
210 Summary request storage unit
220 Results storage unit
300 Control unit
310 Request analysis unit
320 Data acquisition unit
330 Summarized results creation unit
340 Communication unit

The invention claimed is:

1. An information processing device that, based on a command from an application program, acquires a plurality of types of information from a control device that controls a machine, the information processing device comprising:

a summary request storage unit for storing at least one summary request associated with summary request identification information;

a summary request management unit that receives a summary request acquisition request, that reads, from the summary request storage unit, a summary request associated with the summary request identification information included in the summary request acquisition request, and that provides the summary request thus read;

a command execution unit that executes a command read from the application program;

a summary request execution unit that, in a case where the command is a summary request execution command, issues a request to the summary request management unit requesting the summary request associated with summary request identification information included in the summary request execution command, and executes the summary request acquired as a response to the request; and a summary request registration unit that reads a summary request definition file, creates at least one summary request associated with summary request identification information, based on the summary request definition file, and stores the created summary request in the summary request storage unit.

2. The information processing device according to claim 1, further comprising:

a program analysis unit that analyzes the command read from the application program and issues a notification to the command execution unit to execute the analyzed command, wherein, in a case where the command analyzed by the program analysis unit is a command relating to an addition of a predetermined data acquisition command to the summary request, the summary request management unit adds the predetermined data acquisition command to the summary request associated with the summary request identification information designated by the command.

3. The information processing device according to claim 1, further comprising:

a program analysis unit that analyzes the command read from the application program and issues a notification to the command execution unit to execute the analyzed command, wherein, in a case where the command analyzed by the program analysis unit is a command relating to a deletion of a predetermined data acquisition command from the summary request, the summary request management unit deletes the predetermined data acquisition command from the summary request associated with the summary request identification information designated by the command.

4. A non-transitory computer-readable storage medium for storing a program that is executed in an information processing device that, based on a command from an application program, acquires in bulk a plurality of types of information from a control device that controls a machine, the program executing:

in a case where the command read from the application program is a command relating to execution of a summary request, processing to acquire a summary request associated with summary request identification information included in the command, from a summary request storage unit storing at least one summary request associated with the summary request identification information; and processing to acquire in bulk a plurality of types of information from the control device, based on the summary request associated with the summary request identification information thus acquired, processing to acquire in bulk the summary request after reading a summary request definition file, creating at least one summary request associated with summary request identification information, based on the summary request definition file.

* * * * *